(12) United States Patent
Nagornykh (10) Patent No.: US 11,415,674 B2
(45) Date of Patent: Aug. 16, 2022

(54) CHROMATIC POINT SENSOR OPTICAL PEN WITH ADJUSTABLE RANGE AND ADJUSTABLE STAND-OFF DISTANCE

(71) Applicant: Mitutoyo Corporation, Kanagawa-ken (JP)

(72) Inventor: Pavel Ivanovich Nagornykh, Kirkland, WA (US)

(73) Assignee: Mitutoyo Corporation, Kanagawa-ken (JP)

(*) Notice: Subject to any disclaimer, the term of this patent is extended or adjusted under 35 U.S.C. 154(b) by 480 days.

(21) Appl. No.: 16/669,895

(22) Filed: Oct. 31, 2019

(65) Prior Publication Data

US 2021/0132194 A1 May 6, 2021

(51) Int. Cl.
*G01S 7/48* (2006.01)
*G02B 7/04* (2021.01)
*G01S 7/481* (2006.01)

(52) U.S. Cl.
CPC .............. *G01S 7/4816* (2013.01); *G02B 7/04* (2013.01)

(58) Field of Classification Search
CPC ....... G01S 7/4816; G02B 7/04; G01B 11/026; G01B 2210/50; G01B 11/24; G01B 11/02
See application file for complete search history.

(56) References Cited

U.S. PATENT DOCUMENTS

| | | |
|---|---|---|
| 7,477,401 B2 | 1/2009 | Marx et al. |
| 7,626,705 B2 | 12/2009 | Altendorf |
| 7,876,456 B2 | 1/2011 | Sesko |
| 7,990,522 B2 | 8/2011 | Sesko |
| 8,194,251 B2 | 6/2012 | Emtman et al. |
| 8,212,997 B1 | 7/2012 | Xie |

(Continued)

FOREIGN PATENT DOCUMENTS

| | | |
|---|---|---|
| CN | 102650515 A | 8/2012 |
| CN | 106794052 A | 5/2017 |
| DE | 10 2014 108 353 A1 | 12/2014 |

OTHER PUBLICATIONS

Extended European Search Report, dated Apr. 7, 2021, for European Application No. 20202777.7-1010, 8 pages.

(Continued)

*Primary Examiner* — Seung C Sohn
(74) *Attorney, Agent, or Firm* — Seed IP Law Group LLP (57) ABSTRACT

A chromatic point sensor (CPS) optical pen provides a signal usable to measure a distance to a surface, and includes an axial chromatic aberration portion arranged to receive source radiation from an aperture, output it toward the surface as a focused measurement beam having axial chromatic dispersion, receive reflected radiation from the surface and focus it proximate to the aperture. The axial chromatic aberration portion includes a first axially dispersive focusing element that receives the source radiation and focuses it at a first focal region, a second axially dispersive focusing element that receives the radiation from the first focal region and focuses it at a second focal region, and a third axially dispersive focusing element that receives the radiation from the second focal region and outputs the measurement beam. Lengths between the first, second and third axially dispersive focusing elements are adjustable (i.e., resulting in an adjustable range).

25 Claims, 6 Drawing Sheets

(56) References Cited

U.S. PATENT DOCUMENTS

| | | | |
|---|---|---|---|
| 8,587,789 B2* | 11/2013 | Sesko | G01B 11/026 |
| | | | 356/609 |
| 8,817,240 B2 | 8/2014 | Jones et al. | |
| 9,329,026 B2 | 5/2016 | Altendorf | |
| 10,247,610 B2* | 4/2019 | Kubo | G01B 11/0608 |
| 2012/0019821 A1 | 1/2012 | Chen et al. | |
| 2014/0043469 A1 | 2/2014 | Engel et al. | |
| 2014/0043610 A1 | 2/2014 | Engel et al. | |
| 2017/0010452 A1 | 1/2017 | Patzwald et al. | |
| 2018/0259390 A1 | 9/2018 | Marukawa et al. | |

OTHER PUBLICATIONS

Molesini et al., "Pseudocolor Effects of Longitudinal Chromatic Aberration," J. Optics (Paris), 1986, 17(6), pp. 279-282 (4 pages).
Office Action, dated May 7, 2022, for Chinese Patent Application No. 202011194570.0 (26 pages including English Translation).

* cited by examiner

| Config. | Stand-off Distance (SD) [mm] | Working Range (R) [mm] | $L_1$ [mm] | $L_2$ [mm] | Spot Size at SD [μm] | Spot Size at SD+R [μm] |
|---|---|---|---|---|---|---|
| 1 | 2 | 4 | 11.311 | 13.456 | 14 | 31 |
| 2 | 2 | 8 | 10.190 | 15.466 | 22 | 98 |
| 3 | 3 | 8 | 11.071 | 12.349 | 21 | 62 |
| 4 | 4 | 7 | 13.916 | 9.440 | 20 | 35 |
| 5 | 4 | 10 | 11.759 | 10.756 | 20 | 60 |

FIG.6

CHROMATIC POINT SENSOR OPTICAL PEN WITH ADJUSTABLE RANGE AND ADJUSTABLE STAND-OFF DISTANCE

BACKGROUND

Technical Field

The invention relates generally to precision measurement instruments, and more particularly to a chromatic point sensor (CPS) optical pen having an adjustable range and an adjustable stand-off distance.

Description of the Related Art

Axial chromatic aberration techniques may be utilized for distance sensing metrology. As described in "Pseudocolor Effects of Longitudinal Chromatic Aberration", G. Molesini and S. Quercioli, J. Optics (Paris), 1986, Volume 17, No. 6, pages 279-282, controlled longitudinal chromatic aberration (also referred to herein as axial chromatic dispersion) may be introduced in an optical imaging system, causing the imaging system focal length to vary with wavelength, which provides means for optical metrology. In particular, a lens can be designed whose back focal length (BFL) is a monotonic function of wavelength. In white light operation, such a lens exhibits a rainbow of axially dispersed foci that can be used as a spectral probe for distance sensing applications.

As a further example, U.S. Pat. No. 7,477,401, which is incorporated herein by reference, discloses that an optical element having axial chromatic aberration may be used to focus a broadband light source such that the axial distance or height of a surface determines which wavelength is best focused at that surface. Upon reflection from the surface, the light is refocused onto a small detector aperture, such as a pinhole and/or the end of an optical fiber, and only the wavelength that is well-focused on the surface is well-focused on the aperture. Other wavelengths are poorly focused and will not couple much power into the aperture. A spectrometer measures the signal level for each wavelength returned through the aperture. A wavelength intensity peak effectively indicates the distance or height of the surface.

Certain manufacturers refer to a practical and compact optical assembly that is suitable for chromatic confocal ranging in an industrial setting as a chromatic confocal point sensor, a chromatic point sensor (CPS) including an optical pen and/or as simply an "optical pen." One example of optical pen instruments that measure Z height are those manufactured by STIL, S.A. of Aix-en-Provence, France (STIL S.A.). As a specific example, the STIL optical pen model number OP 300NL measures Z heights and has a 300 micron range.

Another configuration for a chromatic confocal point sensor and optical pen is described in commonly assigned U.S. Pat. No. 7,626,705 (the '705 patent), which is hereby incorporated herein by reference in its entirety. The '705 patent discloses a lens configuration providing an improved optical throughput and an improved spot size which results in improved measurement resolution in comparison with various commercially available configurations.

One measure of a technical merit of an optical pen is its range-to-resolution ratio; for example a versatile optical pen should be able to measure over a long range with high resolution. However, there are design constraints that limit how much one can extend a range of an optical pen while maintaining high resolution measurement capability throughout the range.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In view of the desirability to extend a range of an optical pen while maintaining high resolution measurement capability throughout the range, the inventor has devised a technical solution comprising a CPS optical pen with an adjustable range and an adjustable stand-off distance. As used herein, a range is the space or extent that can be measured by an optical pen; that is, a distance to a target object placed within the range can be measured by an optical pen. A stand-off distance refers to a distance from a measurement beam exit point of an optical pen to a starting point of the range (i.e., a terminal point of the range closest to the optical pen). By adjusting the range of an optical pen, for example, from range A to range B, an effective overall range of the optical pen becomes a combination of range A and range B and thus extended while range A and range B maintain their respective high resolution measurement capabilities. By adjusting the stand-off distance of an optical pen, for example, from a short stand-off distance to a long stand-off distance, even the same-size range will start at two different distances away from the optical pen to thereby extend an effective overall range of the optical pen, as a combination of the same-size range starting at the short stand-off distance away from the optical pen and the same-size range starting at the long stand-off distance away from the optical pen.

According to various exemplary embodiments of the present invention, a chromatic point sensor (CPS) optical pen is provided, which is operable to provide a signal usable to measure a distance to a surface. The CPS optical pen includes a housing; an aperture that outputs source radiation and receives reflected radiation; and an axial chromatic aberration portion arranged along an optical axis of the CPS optical pen. The axial chromatic aberration portion is configured to receive the source radiation from the aperture, output it toward the surface as a focused measurement beam having axial chromatic dispersion, receive reflected radiation from the surface and focus the reflected radiation proximate to the aperture with axial chromatic dispersion. The axial chromatic aberration portion is formed of a plurality of axially dispersive focusing elements including: a first axially dispersive focusing element that receives the source radiation and focuses that radiation at a first focal region internal to the axial chromatic aberration portion, a second axially dispersive focusing element that receives the radiation from the first focal region and focuses that radiation at a second focal region internal to the axial chromatic aberration portion, and a third axially dispersive focusing element that receives the radiation from the second focal region and outputs the measurement beam. A first length between the first and second axially dispersive focusing elements is configured to be adjustable, and a second length between the second and third axially dispersive focusing elements is configured to be adjustable.

According to various embodiments, the first length and the second length are adjustable during manufacturing of the CPS optical pen.

According to various embodiments, the CPS optical pen includes an actuator configured to adjust the first length and the second length, wherein the actuator is operable by a user of the CPS optical pen. According to various embodiments, the actuator includes one or more linear actuators to slide at least one of the first, second, and third axially dispersive focusing elements relative to each other to change the first length and the second length.

According to various embodiments, the CPS optical pen is configurable in a plurality of configurations, wherein the plurality of configurations are defined by respective values of the first length and respective values of the second length. According to various embodiments, the plurality of configurations are further associated with respective values of a stand-off distance of the CPS optical pen, and respective values of a range of the CPS optical pen. According to various embodiments, the values of a range may range between 3 mm and 30 mm, and the values of a stand-off distance may range between 2 mm and 7 mm. According to various embodiments, the plurality of configurations are further associated with respective values of a spot size of the measurement beam at the stand-off distance, and respective values of a spot size of the measurement beam at the range added to the stand-off distance.

According to various embodiments, the CPS optical pen includes an electronics portion with a signal processor, wherein the adjustment of the first and second lengths achieves a stand-off distance and range sufficient for measuring workpieces (e.g., having approximate and/or estimated dimensions), and the electronics portion is configured to be operated to determine measurements of the workpieces. According to various embodiments, the determined measurements are included in a first set of measurements which are taken with the first and second lengths having been adjusted to first values as part of a first configuration, and after the electronics portion is operated to take the first set of measurements, the first and second lengths are configured to be adjustable to second values as part of a second configuration and the electronics portion is configured to be operated to determine measurements of workpieces (e.g., the same or different workpieces) as part of a second set of measurements.

According to further exemplary embodiments, a method is provided of adjusting a range and a stand-off distance of a chromatic point sensor (CPS) optical pen operable to provide a signal usable to measure a distance to a target surface. The method includes providing a CPS optical pen including a housing; an aperture that outputs source radiation and receives reflected radiation; and an axial chromatic aberration portion arranged along an optical axis of the CPS optical pen. The axial chromatic aberration portion is configured to receive the source radiation from the aperture, output it toward the surface as a focused measurement beam having axial chromatic dispersion, receive reflected radiation from the surface and focus the reflected radiation proximate to the aperture with axial chromatic dispersion. The axial chromatic aberration portion is formed of a plurality of axially dispersive focusing elements including: a first axially dispersive focusing element that receives the source radiation and focuses that radiation at a first focal region internal to the axial chromatic aberration portion, a second axially dispersive focusing element that receives the radiation from the first focal region and focuses that radiation at a second focal region internal to the axial chromatic aberration portion, and a third axially dispersive focusing element that receives the radiation from the second focal region and outputs the measurement beam. The method includes adjusting a first length between the first and second axially dispersive focusing elements and a second length between the second and third axially dispersive focusing elements.

According to various embodiments, the step of adjusting the first length and the second length is performed during manufacturing of the CPS optical pen.

According to various embodiments, the CPS optical pen includes an actuator configured to adjust the first length and the second length, and the step of adjusting the first length and the second length is performed by a user of the CPS optical pen.

According to various embodiments, the CPS optical pen is configurable in a plurality of configurations, the plurality of configurations are defined by respective values of the first length and respective values of the second length, and the step of adjusting the first length and the second length includes selecting one of the plurality of configurations. According to various embodiments, the plurality of configurations are associated with respective values of a stand-off distance of the CPS optical pen and respective values of a range of the CPS optical pen, and the step of adjusting the first length and the second length includes selecting desired values of the stand-off distance and the range.

According to various embodiments, the method includes stitching of multiple ranges including:

for measuring a first range, selecting a first configuration out of the plurality of configurations, the first configuration associated with a first stand-off distance and the first range, wherein the adjusting of the first and second lengths is to achieve the first configuration for measuring the first range, and     for measuring a second range different from the first range, selecting a second configuration out of the plurality of configurations, the second configuration associated with a second stand-off distance and the second range, and adjusting the first and second lengths to achieve the second configuration for measuring the second range.

According to various embodiments, the method includes:
initially determining dimensions of workpieces to be measured (e.g., for which the dimensions may be approximate, estimated, etc.), wherein the adjustment of the first and second lengths achieves a stand-off distance and range sufficient for measuring the workpieces; and after the adjustment, operating the CPS optical pen to take measurements of the workpieces.

According to various embodiments, the measurements of the workpieces are included in a first set of measurements which are taken with the first and second lengths having been adjusted to first values as part of a first configuration, and after the CPS optical pen is operated to take the first set of measurements, the method further comprises adjusting the first and second lengths to second values as part of a second configuration and operating the CPS optical pen to take a second set of measurements of workpieces (e.g., the same or different workpieces for which the first set of measurements were taken).

According to various embodiments, the adjustment of the first and second lengths is to first values as part of a first configuration that achieves a first range, and the method further comprises operating the CPS optical pen with the first configuration to take a first set of measurements of a workpiece. After the first set of measurements is taken, the first and second lengths may be adjusted to second values as part of a second configuration that achieves a second range that is smaller than the first range, and the CPS optical pen may be operated with the second configuration to take a second set of measurements of the workpiece, wherein the second set of measurements may correspond to at least one of higher resolution or smaller spot sizes than the first set of measurements.

DETAILED DESCRIPTION

Figure 1:
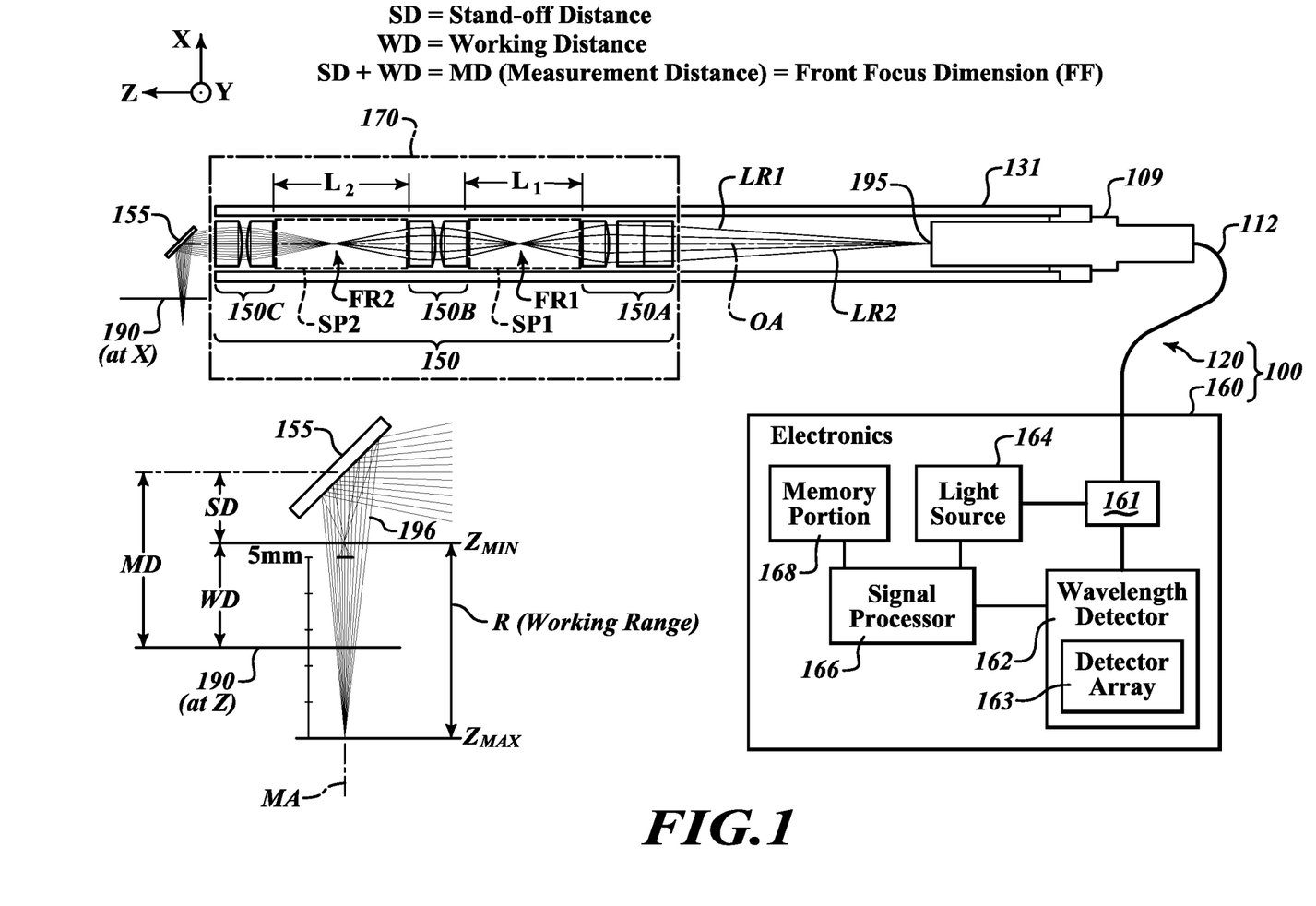
FIG. 1 is a block diagram of an exemplary chromatic point sensor (CPS) optical pen with an adjustable range and an adjustable stand-off distance.

FIG. 1 is a block diagram of an exemplary chromatic confocal point sensor or a chromatic point sensor (CPS) 100. The CPS 100 has certain similarities to sensors described in U.S. Pat. Nos. 7,876,456; 7,990,522; and 8,194,251, which are incorporated herein by reference in their entirety. As shown in FIG. 1, the CPS 100 includes an optical pen 120 and an electronics portion 160. The optical pen 120 includes a fiber optic connector 109, a housing 131 that extends along a central Z optical axis (OA) of the optical pen 120, and an axial chromatic aberration portion 150. As illustrated, the fiber optic connector 109 is attached to the end of the housing 131, and receives an in/out optical fiber (not shown in detail) encased in a fiber optic cable 112 extending from the electronics portion 160. The in/out optical fiber outputs source light from a light source 164 (in the electronics portion 160) through a fiber confocal aperture 195, and receives reflected measurement light also through the fiber confocal aperture 195.

In operation, the axial chromatic aberration portion 150, which includes a lens or lenses that provide an axial chromatic aberration (dispersion), inputs (receives) broadband (e.g., white) source light emitted from the fiber end through the fiber confocal aperture 195. The chromatic aberration portion 150 outputs the received source light toward a surface to be measured as a focused measurement beam (or measurement light) 196 having axial chromatic dispersion, receives reflected radiation from the surface and focuses the reflected radiation proximate to the fiber confocal aperture 195 with axial chromatic aberration. In the illustrated embodiment of FIG. 1, the optical axis OA of the optical pen 120 is bent 90 degrees due to the placement of a reflector 155, to be described below, thus the measurement light 196 propagates generally downwardly in FIG. 1. As a result of the axial chromatic dispersion, the focal point of the measurement light 196 along the optical axis OA (which coincides with the measurement axis MA in FIG. 1) is at different distances depending on the wavelength of the light, as is known for chromatic confocal sensor systems. The measurement light 196 includes a wavelength that is focused on a workpiece surface 190 at a position Z, which is at a measurement distance (MD) relative to the optical pen 120. Upon reflection from the workpiece surface 190, reflected measurement light is refocused by the axial chromatic aberration portion 150 onto the fiber confocal aperture 195. The operative source light and reflected measurement light are bounded by the limiting rays LR1 and LR2. Due to the axial chromatic aberration, only one wavelength will have a front focus dimension FF that matches the measurement distance MD from the optical pen 120 to the surface 190. The optical pen is configured such that the wavelength that is best focused at the surface 190 will also be the wavelength of the reflected measurement light that is best focused at the fiber confocal aperture 195. The fiber confocal aperture 195 spatially filters the reflected measurement light such that predominantly the best focused wavelength passes through the fiber confocal aperture 195 and into the core of the fiber optic cable 112. The fiber optic cable 112 routes the reflected measurement light to a wavelength detector 162 configured to determine the wavelength having the dominant intensity, which corresponds to the measurement distance (MD) to the workpiece surface 190.

As illustrated, the optical pen 120 has a working range (or "range" for short) R that is bound by a minimum range distance ZMIN and a maximum range distance ZMAX, and the surface 190 needs to be located within the working range R to be measurable. The working range R of an optical pen 120 may vary between a few millimeters to tens of millimeters. According to various embodiments, the working range R may be adjustably set based on configuration of the axial chromatic aberration portion 150, as will be more fully described below.

As illustrated, the measurement distance MD, which is a distance from the optical pen 120 to a point at which a measurement is made (at the workpiece surface 190), is a sum of a stand-off distance SD and a working distance WD. The stand-off distance SD is defined as a distance from the measurement beam exit point of the optical pen 120 (which is at a reflector 155 in the illustrated configuration) to a starting point of the range, which is at the minimum range distance ZMIN of the range R. The working distance WD is defined as a distance from the minimum range distance ZMIN to the workpiece surface 190 at which a measurement is made.

While FIG. 1 illustrates the optical pen 120 having its measurement axis MA along the Z axis "bent" at the reflector 155 so as to redirect the measurement beam 196 at a generally right angle relative to the axis of the optical pen 120, other configurations of the optical pen 120 in which the measurement axis MA bends at other angles (other than 90 degrees) or does not bend are equally possible as apparent to those skilled in the art. The illustrated "bent" configuration may be technically advantageous in forming an optical pen suitable for measuring various characteristics of a hole. For example, such optical pen may be inserted into a hole, such that the measurement beam propagates at a right angle relative to the axis of the optical pen to measure a hole diameter or the surface condition (e.g., smoothness, internal threads structure) of a hole's internal wall.

The electronics portion 160 includes a fiber coupler 161, the wavelength detector 162, the light source (source light generating portion) 164, a signal processor 166 and a memory portion 168. In various embodiments, the wavelength detector 162 includes a spectrometer or spectrograph arrangement wherein a dispersive element (e.g., a grating) receives the reflected measurement beam through the fiber optic cable 112 and transmits the resulting spectral intensity profile to a detector array 163. The wavelength detector 162 may also include related signal processing (e.g., provided by the signal processor 166 in some embodiments) that removes or compensates certain detector-related error components from the spectral intensity profile. Thus, certain aspects of the wavelength detector 162 and the signal processor 166 may be merged and/or indistinguishable in some embodiments.

The white light source 164, which is controlled by the signal processor 166, is coupled through the optical coupler 161 (e.g., a 2×1 optical coupler) to the fiber optic cable 112. As described above, the measurement light based on the source light travels through the optical pen 120, which produces longitudinal chromatic aberration so that its focal length changes with the wavelength of the light. The wavelength of measurement light that is most efficiently transmitted back through the fiber optic cable 112 is the wavelength that is in focus on the surface 190 at the position Z. The reflected wavelength-dependent measurement light intensity then passes through the fiber coupler 161 again to be directed to the wavelength detector 162, which generates a spectral intensity profile. The detector array 163 receives the spectral intensity profile, which is distributed over an array of pixels along a measurement axis of the detector array 163. The spectral intensity profile from the detector array 163 will include a spectral peak component that corresponds to a unique distance from the optical pen 120 to the measured surface 190 (at Z) (i.e., the measurement distance MD). By moving the optical pen 120 and/or workpiece surface 190 relative to one another, different measurements may be taken/determined/obtained for different surface points on the workpiece surface 190. In this manner, through the above described operations (e.g., including those of the electronics portion 160 with the signal processor 166), the optical pen 120 is able to be utilized/operated to take measurements of workpieces (e.g., as illustrated by the operations for taking the measurement corresponding to the measurement distance MD to the workpiece surface 190).

Figure 2:
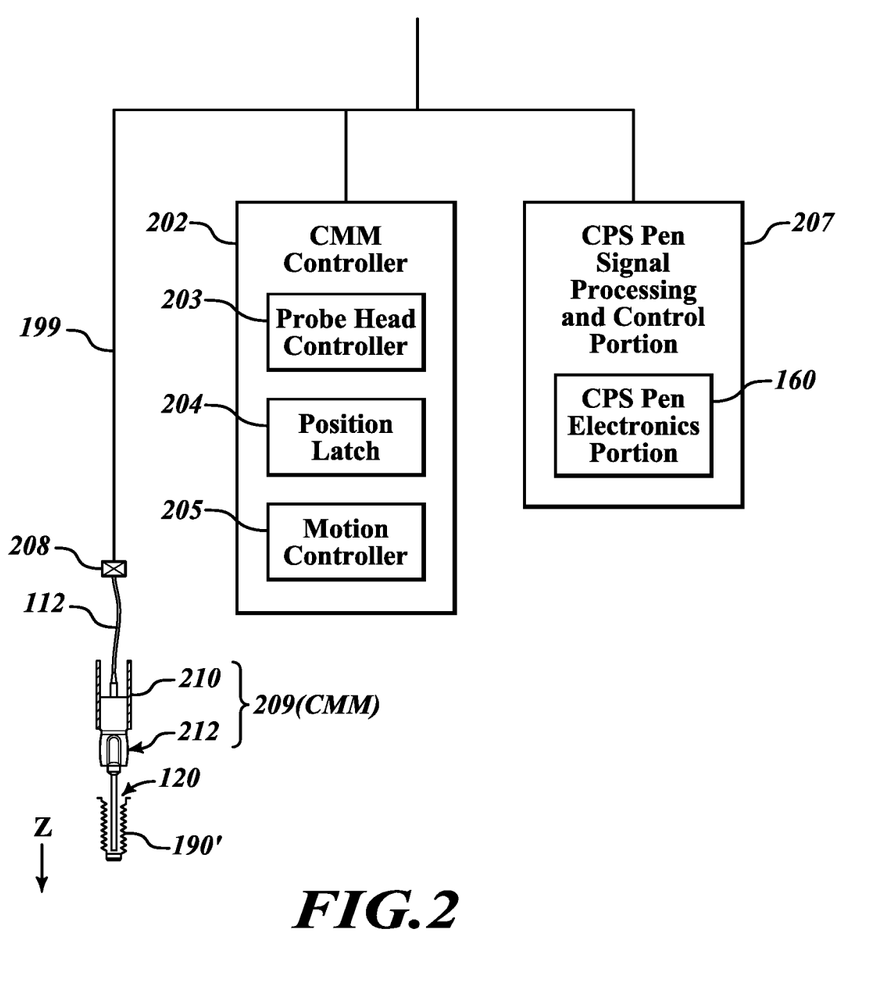
FIG. 2 is a block diagram of a CPS system including an optical pen and an electronics portion, which may be coupled to an external device in the form of a coordinate measuring machine (CMM) according to an exemplary embodiment.

As shown in FIG. 2, in applications to measure or inspect various geometric characteristics of work surfaces (e.g., a hole's threaded surface 190'), the optical pen 120 may be coupled to any coordinate measuring machine (CMM) 209 known in the art, which is capable of controlling the precise position of the optical pen 120 along each of X, Y and Z axes. Typically, a CMM has a bridge movable along one axis of the XY plane, and a carriage movable along the bridge along the other axis of the XY plane. The Z-axis movement is provided by a vertical quill 210 that moves up and down through the carriage. As shown in FIG. 2, the distal end of the vertical quill 210 of the CMM 209 includes a probe head 212 configured to receive a variety of interchangeable optical pens 120 according to various embodiments of the present invention. In FIG. 2, the fiber optic cable 112 provides signals to and receives signals from the optical pen 120. The CMM 209, to which the optical pen 120 is coupled, communicates with other components through a data transfer line 199 (e.g., a bus), which is connected by a connector 208 (e.g., a "micro-D" type connector) to the fiber optic cable 112 of the optical pen 120. The CMM 209, to which the optical pen 120 is coupled, is controlled by a CMM controller 202, while the optical pen 120 exchanges data with, and is controlled by, a CPS pen signal processing and control circuit 207 (e.g., in one embodiment provided by the signal processor 166 and the memory portion 168 in the electronics portion 160 of FIG. 1). The CMM controller 202 in the illustrated example includes a probe head controller 203 configured to control operation of the probe head 212, a position latch 204 that produces an XYZ position of the probe head 212, and a motion controller 205 configured to control the precise position and movement of the probe head 212 and hence of the optical pen 120 in X-, Y- and Z-directions, as known in the art.

The inventor has found that, by configuring the axial chromatic aberration portion 150 with at least three axially dispersive focusing elements respectively separated by a first length (between the first and second axially dispersive focusing elements) and a second length (between the second and third axially dispersive focusing elements) and by adjusting the first length and the second length, the range as well as the stand-off distance of an optical pen can be adjusted. With each adjustable range associated with high resolution measurement capability, a suitable range with high resolution measurement capability may be selected for each measurement application, and/or used in combination with another range also with high resolution measurement capability to thereby extend an effective overall range of the optical pen or optical pens.

In the embodiment shown in FIG. 1, the axial chromatic aberration portion 150 includes a first axially dispersive focusing element 150A, a second axially dispersive focusing element 150B, and a third (or last) axially dispersive focusing element 150C. In the illustrated example, the third axially dispersive focusing element 150C is the last axially dispersive focusing element because it outputs the measurement beam 196 from the optical pen 120 toward the surface 190 to be measured.

In various embodiments, each axially dispersive focusing element may comprise one or several axially dispersive optical components including aspheric lenses, spherical lenses, refractive lenses, diffractive optical elements, or some complex compound lenses. In various embodiments, the first, second, and third axially dispersive focusing elements 150A, 150B, and 150C may be configured analogously and may include at least one optical component which is identical among some or all of the axially dispersive focusing elements. In some embodiments, some or all of the axially dispersive focusing elements are configured identically with each other. In some embodiments, where multiple optical components (a set of lenses) are used to form an axially dispersive focusing element, each of the multiple optical components is identical to each other. In the illustrated example of FIG. 1, each of the first, second, and third axially dispersive focusing elements 150A, 150B, and 150C includes at least one identical singlet lens. In addition, each of the second and third axially dispersive focusing elements 150B and 150C is formed of two singlet lenses that are identical to each other. The first axially dispersive focusing element 150A includes the singlet lens (i.e., which is identical to all of the singlet lenses in the second and third axially dispersive focusing elements 150B and 150C) and also includes a doublet lens.

In operation, the first axially dispersive focusing element 150A receives source radiation from the aperture 195 and focuses that radiation at a first focal region FR 1 internal to the axial chromatic aberration portion 150. The second axially dispersive focusing element 150B receives the radiation from the first focal region FR 1 and focuses that radiation at a second focal region FR 2 internal to the axial chromatic aberration portion 150. The third axially dispersive focusing element 150C receives the radiation from the second focal region FR 2 and outputs the measurement beam 196 from the optical pen 120 toward the surface 190 to be measured.

Operable wavelengths of the optical pen 120 are focused in the first focal region FR 1 by the first axially dispersive focusing element 150A, and again focused in the second focal region FR 2 by the second axially dispersive focusing element 150B, to be yet again focused in a focal region including the workpiece surface 190 by the third axially dispersive focusing element 150C. The working range R, or more specifically the maximum and minimum range distances ZMAX and ZMIN of the working range R, is determined according to various optical system constraints and factors. For example, the configuration of the wavelength detector itself (see 162 in FIG. 1) is a factor in determining the working ranges. For different anticipated and desired wavelengths that are to be measured, it is desirable that the wavelengths be spread across the array of the detector 162 so that a high level of resolution may be achieved. Another major factor in determining the working ranges is the physical distance, over which the axial chromatic aberration portion 150 is able to focus a specified set of wavelengths using chromatic aberration, with a specified level of accuracy. Such distance may be varied by adjusting the lengths between the first, second, and third axially dispersive focusing elements 150A, 150B, and 150C.

By adjusting the lengths between the first, second, and third axially dispersive focusing elements 150A, 150B, and 150C, a working range R and a stand-off distance SD of the optical pen 120 can be varied. Specifically, a first distance L1 between the first and second axially dispersive focusing elements 150A and 150B is configured to be adjustable, and a second distance L2 between the second and third axially dispersive focusing elements 150B and 150C is configured to be adjustable.

Figure 3:
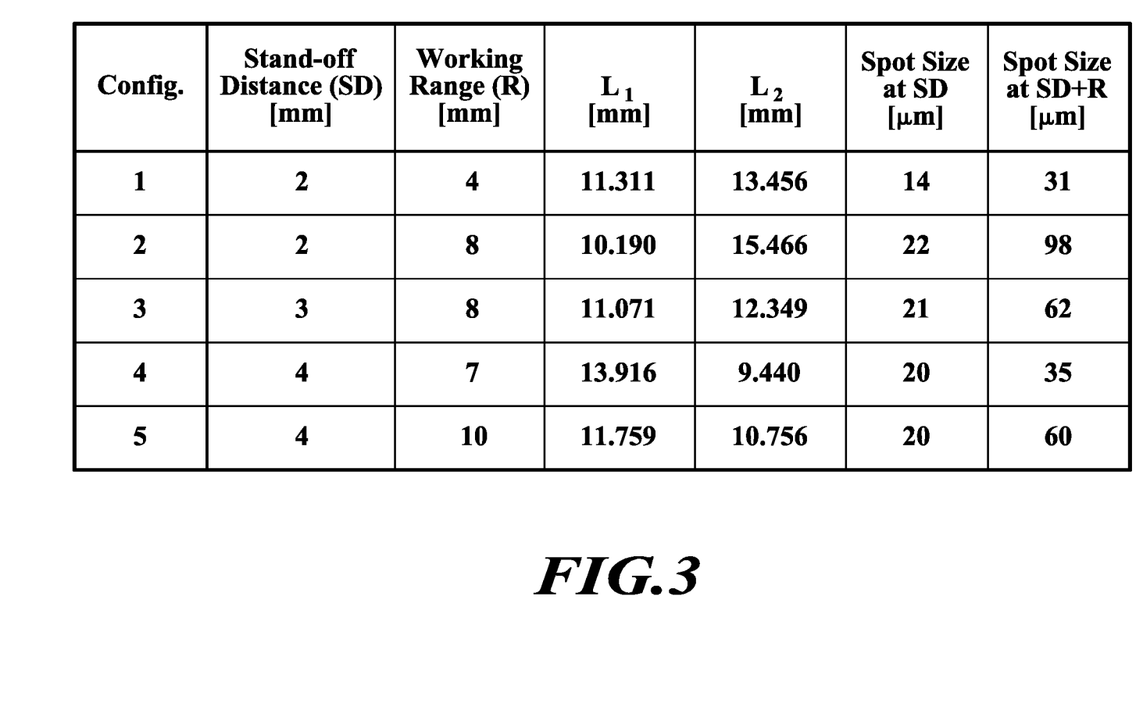
FIG. 3 is a sample table of a plurality of configurations, in any of which a CPS optical pen may be configured, wherein the plurality of configurations are defined by respective values of a first length between the first and second axially dispersive focusing elements and by respective values of a second length between the second and third axially dispersive focusing elements.

FIG. 3 is a sample table of a plurality of configurations (five configurations are shown), in any of which the CPS optical pen 120 may be configured, wherein the configurations are defined by respective values of first length L1 between the first and second axially dispersive focusing elements 150A and 150B and by respective values of second length L2 between the second and third axially dispersive focusing elements 150B and 150C. As illustrated, different configurations (i.e., different sets of first length L1 and second length L2) result in the optical pen 120 having different stand-off distances SD and working ranges R. In the illustrated example, stand-off distances SD can be varied between 2 mm and 4 mm, and working ranges R can be varied between 4 mm and 10 mm. FIG. 3 further shows that different configurations 1-5 are associated with respective values of a spot size of the measurement beam 196 at the stand-off distance SD and with respective values of a spot size of the measurement beam 196 at the working range R added to the stand-off distance SD. For example, configuration 1, having first length L1 of 11.311 mm and second length L2 of 13.456 mm, and stand-off distance SD of 2 mm and working range R of 4 mm, produces a spot size at the stand-off distance SD of 14 um and a spot size at the working range R added to the stand-off distance SD of 31 um. As described above, an improved (smaller) spot size generally contributes to improved (higher) measurement resolution. Thus, any of the plurality of configurations may be selected not only in terms of a desirable stand-off distance and a desirable working range, but also in terms of a desirable spot size at the stand-off distance and a desirable spot size at the working range added to the stand-off distance.

Figure 4:
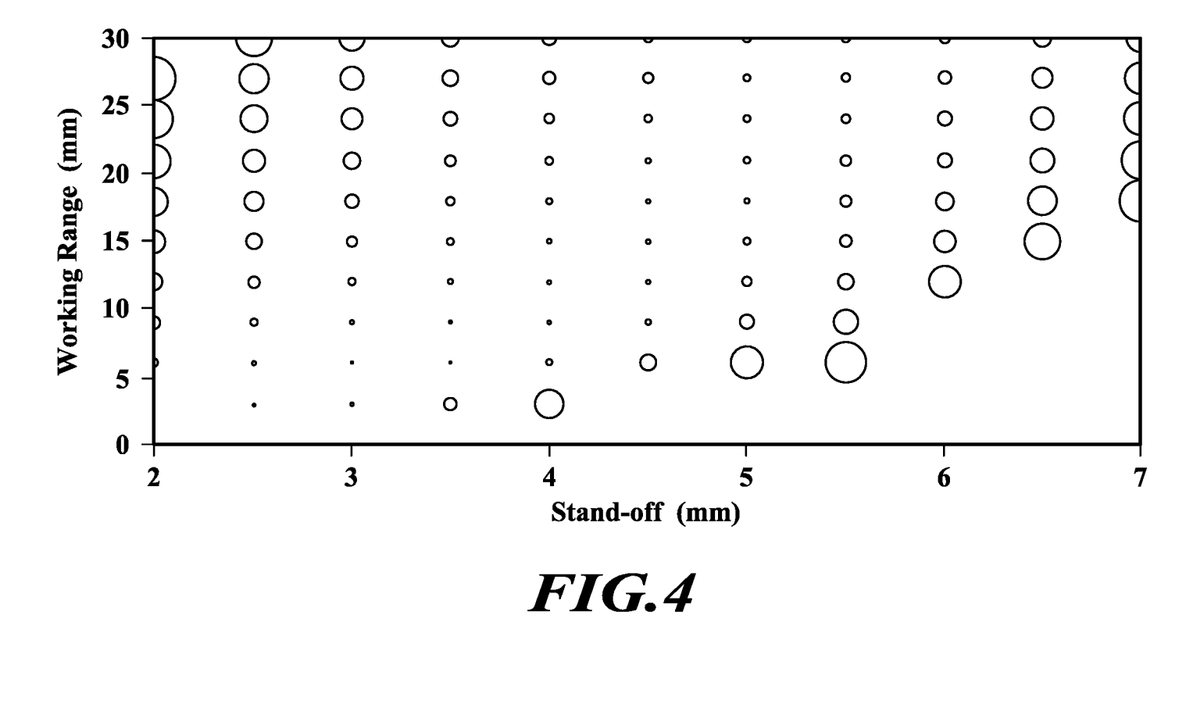
FIG. 4 is a graph illustrating sample values of a range and a stand-off distance of a CPS optical pen achievable according to various exemplary embodiments, as well as correlations between the range and the stand-off distance of the CPS optical pen.

FIG. 4 is a graph illustrating sample values of a working range and a stand-off distance of a CPS optical pen 120 achievable according to various exemplary embodiments. FIG. 4 shows correlations between the working range and the stand-off distance of the CPS optical pen 120. Specifically, for a given working range, there is a range of possible stand-off distances. Similarly, for a given stand-off distance, there is a range of possible working ranges. In FIG. 4, size of the dots represents performance of the optical pen 120 (generally corresponding to the spot size of the measurement beam), where the smaller the dot size the better the performance. Depending on the desirable performance target (corresponding to maximum allowable dot size in FIG. 4), the ranges of possible stand-off distances and of possible working ranges may be identified. In the illustrated example, possible working ranges of the CPS optical pen 120 range between 3 mm and 30 mm, and possible stand-off distances of the CPS optical pen range between 2 mm and 7 mm.

In various embodiments, first length L1 and second length L2 are adjustably set (e.g., utilizing one or more adjustment elements, such as spacing elements SP, or an actuator 170, etc.) during manufacturing of the CPS optical pen 120, to achieve a desirable working range R, a desirable stand-off distance SD, a desirable spot size at the stand-off distance SD, and/or a desirable spot size at the working range R added to the stand-off distance SD. For example, certain spacing elements SP may comprise variously-sized spacers that may be positioned along the axis of the axial chromatic aberration portion 150 to set desirable first length L1 and desirable second length L2. Five different CPS optical pens 120 may be manufactured in configurations 1-5, respectively, as set forth in the table of FIG. 3. A user can then select one of the CPS optical pens 120 having desirable range, stand-off distance, and spot size characteristics.

In various embodiments, referring back to FIG. 1, the CPS optical pen 120 may include one or more adjustment elements (e.g., an actuator 170 and/or spacing elements SP, etc.) configured to adjust first length L1 and second length L2 of the optical pen 120, which can be operated/utilized by a user of the CPS optical pen to adjust the range, stand-off distance, and spot size characteristics of the optical pen 120 before each use. In some embodiments, an actuator 170 comprises one or more linear actuators structured and configured to slide at least one of the first, second, and third axially dispersive focusing elements 150A, 150B, and 150C relative to each other to change first length L1 and second length L2. Suitable linear actuators include, but not limited to, an electric, piezoelectric, electro-mechanical, electromagnetic, magnetic, hydraulic, and pneumatic actuators as well as a mechanical actuator such as a screw joint and a cam mechanism. In various embodiments, spacing elements SP may comprise adjustable portions of the actuator 170 and/or may comprise separate spacers (e.g., fixed or adjustable) that are utilized to set the lengths L1 and L2. In various embodiments, a spacing element SP1 may be positioned/located between the axially dispersive focusing elements 150A and 150B (i.e., as setting/corresponding to the length L1) and a spacing element SP2 may be positioned/located between the axially dispersive focusing elements 150B and 150C (i.e., as setting/corresponding to the length L2). In various embodiments, such adjustment elements are configured to not block or otherwise inhibit/interfere with the focused radiation from the axially dispersive focusing elements 150A, 150B and 150C from travelling along its intended path (e.g., for the outputting of the measurement beam, etc.) For example, such adjustment elements may include portions that are located outside of the operable path for the radiation (e.g., proximate to the housing 131 and/or otherwise primarily contacting and/or being proximate to the outer edges of the axially dispersive focusing elements 150A, 150B and 150C, etc.) and/or may include optically transparent or otherwise transmissive portions that allow the radiation to pass through, etc. In various embodiments, certain types of adjustment elements (e.g., actuators, adjustable spacers, etc.) may have certain advantages (e.g., having externally accessible portions such as adjustment screw portions etc. for performing the adjustments and/or requiring limited or no disassembly of the CPS optical pen and/or external access to or removal of the axially dispersive focusing elements 150A, 150B and 150C in order for the adjustments to be performed, etc.)

While FIG. 1 illustrates the axial chromatic aberration portion 150 including the first, second, and third axially dispersive focusing elements 150A, 150B, and 150C, in some embodiments the axial chromatic aberration portion 150 may include additional axially dispersive focusing element(s). For example, the second axially dispersive focusing element 150B may be formed of at least two intermediate axially dispersive focusing elements (not shown) including a first intermediate axially dispersive focusing element and a last intermediate axially dispersive focusing element. The first intermediate axially dispersive focusing element receives the radiation from the first focal region FR 1 and focuses that radiation at a first intermediate focal region, and the last intermediate axially dispersive focusing element receives radiation from a last intermediate focal region and focuses that radiation at the second focal region FR 2.

Figure 5:
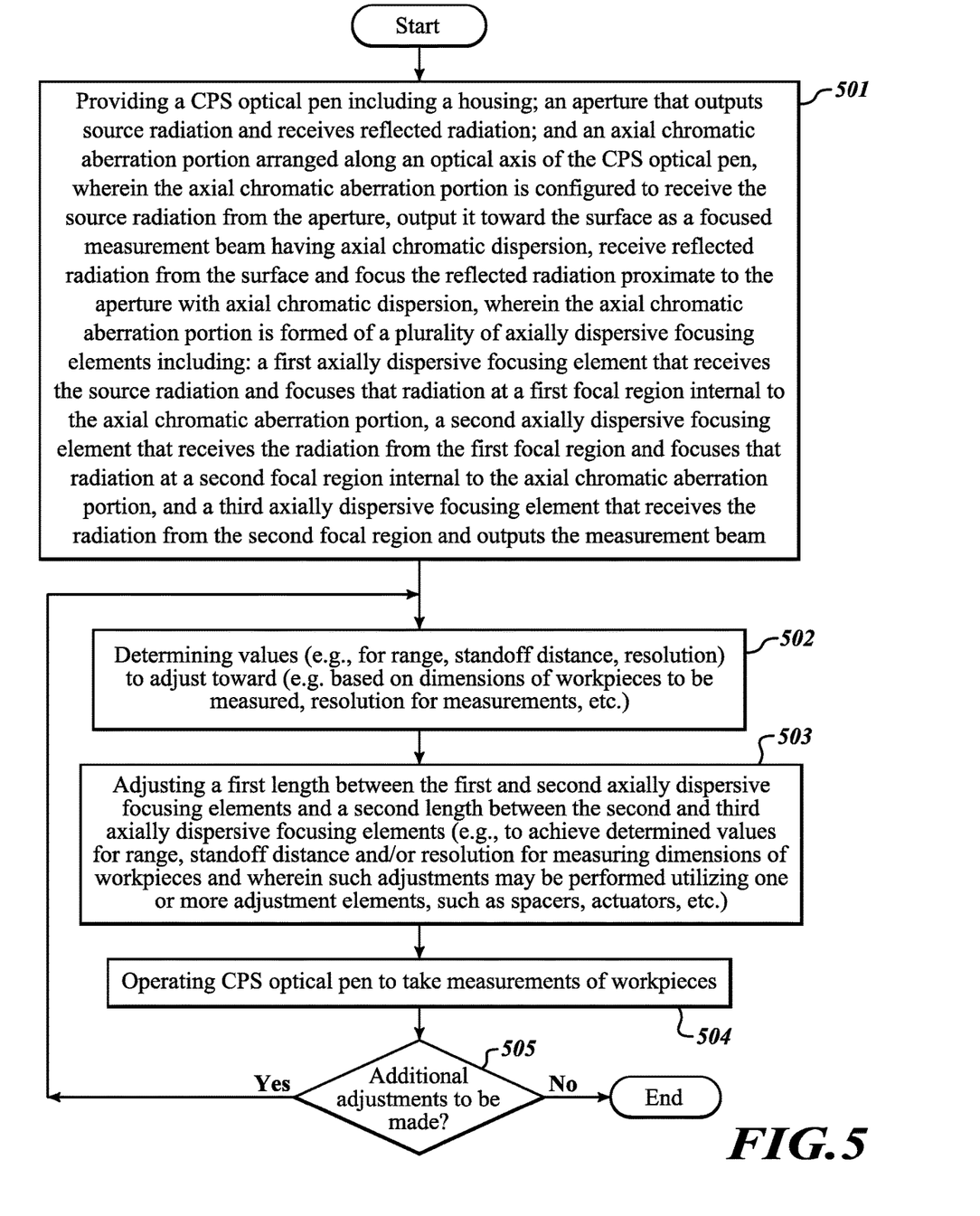
FIG. 5 is a flowchart illustrating a method of adjusting a range and a stand-off distance of a CPS optical pen according to an exemplary embodiment.

FIG. 5 is a flowchart illustrating a method of adjusting a range and a stand-off distance of a CPS optical pen 120 according to an exemplary embodiment, wherein the optical pen 120 is operable to provide a signal usable to measure a distance to a target surface 190. In step 501, the method provides a CPS optical pen 120 configured in a manner described above. Specifically, the CPS optical pen 120 includes a housing 131; an aperture 195 that outputs source radiation and receives reflected radiation; and an axial chromatic aberration portion 150 arranged along an optical axis of the CPS optical pen 120. The axial chromatic aberration portion 150 is configured to receive the source radiation from the aperture 195, output it toward the surface 190 as a focused measurement beam having axial chromatic dispersion, receive reflected radiation from the surface 190 and focus the reflected radiation proximate to the aperture 195 with axial chromatic dispersion. The axial chromatic aberration portion 150 is formed of a plurality of axially dispersive focusing elements including: a first axially dispersive focusing element 150A that receives the source radiation and focuses that radiation at a first focal region FR 1 internal to the axial chromatic aberration portion 150, a second axially dispersive focusing element 150B that receives the radiation from the first focal region FR 1 and focuses that radiation at a second focal region FR 2 internal to the axial chromatic aberration portion 150, and a third axially dispersive focusing element 150C that receives the radiation from the second focal region FR 2 and outputs the measurement beam 196.

In step 502, the method determines values for being adjusted toward. In various embodiments, such values may correspond to the range, stand-off distance and/or resolution for the CPS optical pen for taking measurements of workpieces etc. In various embodiments, the determination of the values may include determining the dimensions (e.g. actual, approximated, estimated, etc.) of workpieces to be measured (e.g., as may correspond to a range, stand-off distance etc.) and/or a desired resolution for the measurements.

In step 503, the method adjusts first length L1 between the first and second axially dispersive focusing elements 150A and 150B and second length L2 between the second and third axially dispersive focusing elements 150B and 150C. In various embodiments, the adjustments may be made for achieving a range and a stand-off distance capable of measuring the dimensions of the workpieces and/or to achieve a desired resolution (i.e., as corresponding to spot size(s)) for the measurements. In various embodiments, the adjustments may be performed by utilizing one or more adjustment elements, such as spacers, actuators, etc. for adjusting the spacings as corresponding to the first and second lengths L1 and L2 as described above. For example, during a manufacturing process, identical sets of optical elements/lenses 150A, 150B and 150C may be utilized along with one or more adjustment elements for performing the adjustments (e.g., different sized and/or adjustable spacers may be available and selected from for inserting between the optical elements/lenses to form a particular configuration for a particular application and/or a linear actuator may be utilized for adjusting the spacings, etc.) As another example, a user may make the adjustments (e.g., utilizing a linear actuator and/or spacers for adjusting the first and second lengths, etc.) In step 504, the method includes operating the CPS optical pen to take the measurements of the workpieces.

In decision step 505, a determination is made as to whether additional adjustments are to be performed. If no additional adjustments are to be made, the method ends. If additional adjustments are to be made, the method returns to step 502. For example, after a process for taking a first set of measurements of workpieces is complete, for a next application a second set of measurements of workpieces (e.g., the same or different workpieces) may be taken, and for which the dimensions to be measured and/or desired resolution may be different thus requiring a different configuration of the CPS optical pen.

As an example involving measurements of workpieces, in one specific example application various radii of tubing may be measured (e.g. for which the CPS optical pen may be inserted into the middle of the tubing and/or either the tubing or the CPS optical pen may be rotated/moved relative to one another so that the measurement beam is directed toward/scans along an inner surface of the tubing). For such applications, the radii of the tubing to be measured may vary in size, and it will be appreciated that in some instances such variations may be greater than a typical working range of previously known CPS optical pens. In order to perform such measurements, in accordance with principles disclosed herein, the lengths L1 and L2 of the CPS optical pen 120 may be adjusted (i.e. so as to adjust the range, stand-off distance, resolution, etc.) so as to be able to perform the desired measurements. Some specific example values for such measurements are discussed in more detail below with respect to the example values from FIG. 3.

With respect to some specific example values, for an application for measuring radii of tubing that may vary from 2 mm to 6 mm, the lengths L1 and L2 may be adjusted to correspond to configuration 1 of FIG. 3. As a further example, if for a next application the radii of tubing to be measured may vary from 2 mm to 10 mm, the lengths L1 and L2 may be adjusted to correspond to configuration 2 of FIG. 3. Similarly, if for a next application the radii of tubing to be measured may vary from 3 mm to 11 mm, the lengths L1 and L2 may be adjusted to correspond to configuration 3 of FIG. 3. In accordance with these examples, it will be appreciated that the lengths L1 and L2 may be configured to be adjusted to first values as part of a first configuration for taking a first set of measurements, and may then be adjusted to second values as part of a second configuration for taking a second set of measurements, and may then be adjusted to third values as part of a third configuration for taking a third set of measurements, etc.

In further regard to an application for measuring radii of tubing that may vary from 3 mm to 11 mm, it will be appreciated that other configurations of FIG. 3 may not be selected/able to be utilized for such applications. For example, configuration 1 would not have a sufficient range for such an application (i.e., with a range of only 2 mm to 6 mm), while configurations 4 and 5 would have stand-off distances (i.e., at 4 mm) that would be too long for enabling measurements at or near the lower end of the range (e.g., at or near 3 mm, 3.5 mm, etc.) Thus, if a CPS optical pen was initially or otherwise previously adjusted to correspond to configurations 1, 4 or 5, in order to perform measurements for the range of 3 mm to 11 mm, the CPS optical pen may be adjusted/readjusted (e.g., to correspond to configuration 3). As another alternative (i.e., as will be described in more detail below with respect to FIG. 6), all or portions of certain ranges may be stitched together for certain applications by utilizing different configurations for different portions of an overall range.

As noted above, the selection of the desired configuration and/or the corresponding adjustments to lengths L1 and L2 may be made based at least in part on the physical characteristics (e.g. physical dimensions/measurement distances, etc.) of the workpieces to be measured. As further noted above, the selection may also be made based on a desired resolution for the measurements (e.g. for which smaller spot sizes correspond to higher measurement resolutions). As an example, in an application where the radii of tubing to be measured may range from 3 mm to 10 mm, either configuration 2 or configuration 3 of FIG. 3 could be adjusted toward/selected and utilized for performing such measurements. However, it is noted that the spot size for configuration 2 for the range from 2 mm to 10 mm varies from 22 um to 98 um, while the spot size for configuration 3 for the range from 3 mm to 11 mm varies from 21 um to 62 um. Thus, at 3 mm, it appears that configuration 3 would have better measurement resolution (i.e., since for configuration 2 at 2 mm the spot size is already at 22 um and would generally be increased further at 3 mm, while configuration 3 at 3 mm has a spot size of 21 um). Similarly, at 10 mm it appears that configuration 3 would have better measurement resolution (i.e., since for configuration 2 at 10 mm the spot size is at 98 um, while in configuration 3 at 11 mm the spot size is at 62 mm and would generally be decreased at 10 mm). Thus, for the particular range from 3 mm to 10 mm, configuration 3 may provide higher measurement resolution (i.e. smaller spot size) throughout the range and so may be desirable to be selected for that particular application. In other applications, higher measurement resolutions may be provided for only a portion of a given range relative to other potential configurations, but for which that particular portion may be considered to have higher priority/importance, and for which a configuration with a higher measurement resolution for that portion may be selected. As will be described in more detail below with respect to FIG. 6, all or portions of certain ranges (i.e., with certain measurement resolution(s)) may also be stitched together for certain applications by utilizing different configurations for different portions of an overall range (e.g., which may result in a higher measurement resolution for each portion of an overall range).

As another example involving measurements of workpieces, for certain applications a first configuration may be selected that provides a relatively large range (e.g., for determining a general shape of a workpiece and for which the measurements may have low resolution/large spot size). After the measurements have been taken/determined using the configuration with the large range, a configuration with a relatively smaller range may be selected/adjusted toward (e.g., as utilized for more precisely measuring the dimensions of the workpiece with higher resolution measurements, etc.) As some specific numerical examples, in one application a workpiece to be measured may comprise an elliptically shaped bore with a first radial dimension of 5 mm in one direction and a second radial dimension of 3 mm in another direction. A first configuration for determining the general shape/approximate dimensions of varying workpieces (e.g., such as the bore) may have a stand-off distance (e.g., 2 mm) and a relatively large range (e.g., 7 mm) for generally measuring workpieces. After the first configuration with the relatively large range (e.g., 7 mm) is utilized for determining the general shape/approximate dimensions of the workpiece/bore, a second configuration with a smaller range and/or with better resolution may be selected/adjusted toward for measuring the workpiece/bore again (e.g., with better resolution/smaller spot size for the measurements, etc.) In one specific example implementation, the second configuration may have a stand-off distance (e.g., 2 mm) and a relatively smaller range (e.g., 2 mm with a relatively high resolution/small spot size throughout the range) that may be selected/adjusted toward, for which the relative movement of the CPS optical pen 120 for the measurements may be made to follow the general shape of the bore to maintain a relatively small separation from the workpiece/bore surface so as to remain within the range (e.g., 2 mm) but also to prevent the CPS optical pen 120 from colliding with the workpiece/bore surface and/or from moving closer than the stand-off distance for the second configuration, etc.

It will be appreciated that the CPS optical pen 120 as disclosed herein is configured to enable adjustments to be performed as described above. This is in contrast to certain previously known CPS optical pens, which were not configured for enabling such adjustments. For example, U.S. Pat. No. 8,212,997 illustrates some exemplary implementations of previously known CPS optical pens, and is hereby incorporated herein by reference in its entirety. While the '997 patent discloses how an extended range may be achieved, in such configurations the illustrated ranges and stand-off distances are relatively fixed, and are not configured to be adjustable in the manner disclosed herein. In contrast to such prior implementations, the CPS optical pen 120 (i.e., including the first, second and third axially dispersive focusing elements 150A, 150B and 150C as arranged as disclosed herein) is configured to enable such adjustments to be made.

According to various embodiments, step 502 of adjusting first length L1 and second length L2 is performed during manufacturing of the CPS optical pen 120.

According to various embodiments, the CPS optical pen 120 includes an actuator 170 configured to adjust first length L1 and second length L2, and step 502 of adjusting first length L1 and second length L2 is performed by a user of the CPS optical pen 120 by operating the actuator 170.

According to various embodiments, the CPS optical pen 120 is configurable in a plurality of configurations, which are defined by respective values of first length L1 and respective values of second length L2, and step 502 of adjusting first length L1 and second length L2 includes selecting one of the plurality of configurations. According to various embodiments, the plurality of configurations are associated with respective values of a stand-off distance SD of the CPS optical pen 120 and respective values of a range R of the CPS optical pen 120, and step 502 of adjusting first length L1 and second length L2 includes selecting desired values of the stand-off distance SD and the range R.

Figure 6:
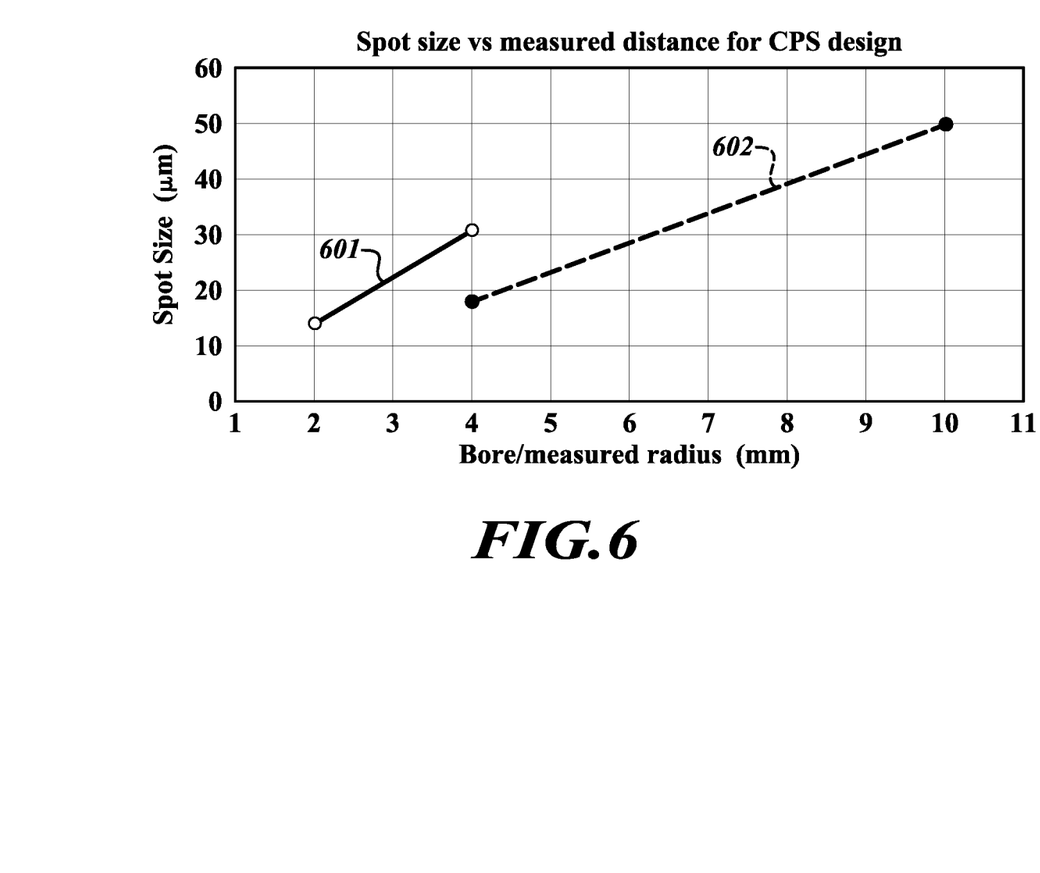
FIG. 6 is a graph illustrating a range-to-resolution ratio of a CPS optical pen having an adjustable range (two ranges are shown), which further illustrates a method of stitching the multiple ranges to thereby increase an effective overall range of the CPS optical pen while maintaining high resolution measurement capability according to one operational example.

As seen in FIGS. 3 and 4, different configurations of the CPS optical pen 120 provide different combinations of the working range, stand-off distance, and spot sizes (performance). Thus, according to various embodiments, a user may "stich" together multiple working ranges by using different configurations of the one or more CPS optical pens in combination, to thereby increase an effective overall range of the CPS optical pen(s) while maintaining high resolution measurement capability. FIG. 6 is a graph illustrating a range-to-resolution ratio of a CPS optical pen 120 having an adjustable range (two ranges are shown, respectively represented by lines 601 and 602). It is assumed that a user wishes to make a measurement of a surface 190 that is located at the measurement distance MD from 2 mm to 10 mm. In this case, a user may select a first configuration, out of the plurality of configurations of the optical pen 120, represented by line 601 that provides a first range of from 2 mm to 4 mm with a desirably small spot size of from 13 um to 31 um. The user may then select a second configuration, out of the plurality of configurations, represented by line 602 that provides a second range of from 4 mm to 10 mm with a desirably small spot size of from 18 um to 50 um. By selecting the first configuration to cover the measurement distance MD from 2 mm to 4 mm and selecting the second configuration to cover the measurement distance MD from 4 mm to 10 mm, the user can make measurements throughout the measurement distance MD from 2 mm to 10 mm, while maintaining high resolution (small spot size) measurement capability.

Various embodiments of the systems and methods of the present invention have been described above. Various features of different embodiments may be selectively combined or replaced to create even further embodiments of the present invention. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A chromatic point sensor (CPS) optical pen operable to provide a signal usable to measure a distance to a surface, the CPS optical pen comprising:
    a housing;
    an aperture that outputs source radiation and receives reflected radiation; and
    an axial chromatic aberration portion arranged along an optical axis of the CPS optical pen to receive the source radiation from the aperture, output it toward the surface as a focused measurement beam having axial chromatic dispersion, receive reflected radiation from the surface and focus the reflected radiation proximate to the aperture with axial chromatic dispersion, wherein:
    the axial chromatic aberration portion is formed of a plurality of axially dispersive focusing elements including: a first axially dispersive focusing element that receives the source radiation and focuses that radiation at a first focal region internal to the axial chromatic aberration portion, a second axially dispersive focusing element that receives the radiation from the first focal region and focuses that radiation at a second focal region internal to the axial chromatic aberration portion, and a third axially dispersive focusing element that receives the radiation from the second focal region and outputs the measurement beam; wherein
    a first length between the first and second axially dispersive focusing elements is configured to be adjustable, and a second length between the second and third axially dispersive focusing elements is configured to be adjustable.

2. The CPS optical pen of claim 1, wherein the first length and the second length are adjustable during manufacturing of the CPS optical pen.

3. The CPS optical pen of claim 1, comprising:
    an actuator configured to adjust the first length and the second length, the actuator operable by a user of the CPS optical pen.

4. The CPS optical pen of claim 3, wherein the actuator comprises one or more linear actuators to slide at least one of the first, second, and third axially dispersive focusing elements relative to each other to change the first length and the second length.

5. The CPS optical pen of claim 1, which is configurable in a plurality of configurations, wherein the plurality of configurations are defined by respective values of the first length and respective values of the second length.

6. The CPS optical pen of claim 5, wherein the plurality of configurations are associated with respective values of a stand-off distance of the CPS optical pen, and respective values of a range of the CPS optical pen.

7. The CPS optical pen of claim 6, wherein the values of a range of the CPS optical pen range between 3 mm and 30 mm and the values of a stand-off distance of the CPS optical pen range between 2 mm and 7 mm.

8. The CPS optical pen of claim 6, wherein the plurality of configurations are associated with respective values of a spot size of the measurement beam at the stand-off distance, and respective values of a spot size of the measurement beam at the range added to the stand-off distance.

9. The CPS optical pen of claim 8, wherein the plurality of configurations includes:
    a first configuration associated with the stand-off distance of 2 mm, the range of 4 mm, the spot size at the stand-off distance of 14 um, and the spot size at the stand-off distance plus the range of 31 um;
    a second configuration associated with the stand-off distance of 2 mm, the range of 8 mm, the spot size at the stand-off distance of 22 um, and the spot size at the stand-off distance plus the range of 98 um;
    a third configuration associated with the stand-off distance of 3 mm, the range of 8 mm, the spot size at the stand-off distance of 21 um, and the spot size at the stand-off distance plus the range of 62 um;

a fourth configuration associated with the stand-off distance of 4 mm, the range of 7 mm, the spot size at the stand-off distance of 20 um, and the spot size at the stand-off distance plus the range of 35 um; and a fifth configuration associated with the stand-off distance of 4 mm, the range of 10 mm, the spot size at the stand-off distance of 20 um, and the spot size at the stand-off distance plus the range of 60 um.

10. The CPS optical pen of claim 1, wherein the second axially dispersive focusing element is formed of at least two intermediate axially dispersive focusing elements including a first intermediate axially dispersive focusing element and a last intermediate axially dispersive focusing element, the first intermediate axially dispersive focusing element receives the radiation from the first focal region and focuses that radiation at a first intermediate focal region, and the last intermediate axially dispersive focusing element receives radiation from a last intermediate focal region and focuses that radiation at the second focal region.

11. The CPS optical pen of claim 1, wherein each of the plurality of axially dispersive focusing elements comprises at least one optical component which is identical among the plurality of axially dispersive focusing elements.

12. The CPS optical pen of claim 11, wherein the plurality of axially dispersive focusing elements are identical to each other.

13. The CPS optical pen of claim 1, wherein each of the plurality of axially dispersive focusing elements comprises one or more aspheric lenses.

14. The CPS optical pen of claim 1, further comprising an electronics portion with a signal processor, wherein an adjustment of the first and second lengths achieves a stand-off distance and range sufficient for measuring the workpieces of certain dimensions, and the electronics portion is configured to be operated to determine measurements of the workpieces.

15. The CPS optical pen of claim 14, wherein the determined measurements are included in a first set of measurements which are taken with the first and second lengths having been adjusted to first values as part of a first configuration, and after the electronics portion is operated to take the first set of measurements, the first and second lengths are configured to be adjustable to second values as part of a second configuration and the electronics portion is configured to be operated to determine measurements of workpieces as part of a second set of measurements.

16. A method of adjusting a range and a stand-off distance of a chromatic point sensor (CPS) optical pen operable to provide a signal usable to measure a distance to a target surface, the method comprising:

providing a CPS optical pen including:
a housing;
an aperture that outputs source radiation and receives reflected radiation; and
an axial chromatic aberration portion arranged along an optical axis of the CPS optical pen to receive the source radiation from the aperture, output it toward the surface as a focused measurement beam having axial chromatic dispersion, receive reflected radiation from the surface and focus the reflected radiation proximate to the aperture with axial chromatic dispersion, wherein:
the axial chromatic aberration portion is formed of a plurality of axially dispersive focusing elements including: a first axially dispersive focusing element that receives the source radiation and focuses that radiation at a first focal region internal to the axial chromatic aberration portion, a second axially dispersive focusing element that receives the radiation from the first focal region and focuses that radiation at a second focal region internal to the axial chromatic aberration portion, and a third axially dispersive focusing element that receives the radiation from the second focal region and outputs the measurement beam; and adjusting a first length between the first and second axially dispersive focusing elements and a second length between the second and third axially dispersive focusing elements.

17. The method of claim 16, wherein the step of adjusting the first length and the second length is performed during manufacturing of the CPS optical pen.

18. The method of claim 16, wherein the CPS optical pen includes an actuator configured to adjust the first length and the second length, and the step of adjusting the first length and the second length is performed by a user of the CPS optical pen.

19. The method of claim 16, wherein the CPS optical pen is configurable in a plurality of configurations, the plurality of configurations are defined by respective values of the first length and respective values of the second length, and the step of adjusting the first length and the second length includes selecting one of the plurality of configurations.

20. The method of claim 19, wherein the plurality of configurations are associated with respective values of a stand-off distance of the CPS optical pen and respective values of a range of the CPS optical pen, and the step of adjusting the first length and the second length includes selecting desired values of the stand-off distance and the range.

21. The method of claim 20, wherein the plurality of configurations are associated with respective values of a spot size of the measurement beam at the stand-off distance, and respective values of a spot size of the measurement beam at the range added to the stand-off distance.

22. The method of claim 20, comprising stitching of multiple ranges including:

for measuring a first range, selecting a first configuration out of the plurality of configurations, the first configuration associated with a first stand-off distance and the first range, wherein the adjusting of the first and second lengths is to achieve the first configuration for measuring the first range, and for measuring a second range different from the first range, selecting a second configuration out of the plurality of configurations, the second configuration associated with a second stand-off distance and the second range, and adjusting the first and second lengths to achieve the second configuration for measuring the second range.

23. The method of claim 16, further comprising:
initially determining dimensions of workpieces to be measured, wherein the adjustment of the first and second lengths achieves a stand-off distance and range sufficient for measuring the workpieces; and
after the adjustment, operating the CPS optical pen to take measurements of the workpieces.

24. The method of claim 23, wherein the measurements of the workpieces are included in a first set of measurements which are taken with the first and second lengths having been adjusted to first values as part of a first configuration, and after the CPS optical pen is operated to take the first set of measurements, the method further comprises adjusting the first and second lengths to second values as part of a second configuration and operating the CPS optical pen to take a second set of measurements of workpieces.

25. The method of claim 16, wherein the adjustment of the first and second lengths is to first values as part of a first configuration that achieves a first range, the method further comprising:
  operating the CPS optical pen with the first configuration to take a first set of measurements of a workpiece;
  adjusting the first and second lengths to second values as part of a second configuration that achieves a second range that is smaller than the first range; and
  operating the CPS optical pen with the second configuration to take a second set of measurements of the workpiece, wherein the second set of measurements correspond to at least one of higher resolution or smaller spot sizes than the first set of measurements.

\* \* \* \* \*